US010948889B2

(12) United States Patent
Arndorfer

(10) Patent No.: US 10,948,889 B2
(45) Date of Patent: Mar. 16, 2021

(54) BUILDING CONTROL SYSTEM

(71) Applicant: ARNDORFER INDUSTRIES, LLC, Ames, IA (US)

(72) Inventor: Ryan Arndorfer, Ames, IA (US)

(73) Assignee: ARNDORFER INDUSTRIES, LLC, Ames, IA (US)

( * ) Notice: Subject to any disclaimer, the term of this patent is extended or adjusted under 35 U.S.C. 154(b) by 91 days.

(21) Appl. No.: 15/969,939

(22) Filed: May 3, 2018

(65) Prior Publication Data

US 2018/0321649 A1 Nov. 8, 2018

Related U.S. Application Data

(60) Provisional application No. 62/501,864, filed on May 5, 2017.

(51) Int. Cl.
| G05B 19/042 | (2006.01) |
| G05B 15/02 | (2006.01) |
| G05G 1/02 | (2006.01) |
| H04L 12/28 | (2006.01) |

(52) U.S. Cl.
CPC .......... *G05B 19/042* (2013.01); *G05B 15/02* (2013.01); *G05B 19/0426* (2013.01); *H04L 12/2816* (2013.01); *G05B 2219/2642* (2013.01); *G05G 1/02* (2013.01)

(58) Field of Classification Search
CPC .. G05B 15/02; G05B 19/042; G05B 19/0426; G05B 2219/2642; G05G 1/02; H04L 12/2816

See application file for complete search history.

(56) References Cited

U.S. PATENT DOCUMENTS

| 2004/0260407 | A1* | 12/2004 | Wimsatt ................. G05B 15/02 700/19 |
| 2010/0145542 | A1* | 6/2010 | Chapel ................ H02J 13/0082 700/295 |
| 2011/0178650 | A1* | 7/2011 | Picco ..................... H05B 45/20 700/295 |
| 2016/0173293 | A1* | 6/2016 | Kennedy ............. H04L 12/2814 709/222 |

* cited by examiner

*Primary Examiner* — Yuhui R Pan
(74) *Attorney, Agent, or Firm* — Zarley Law Firm, P.L.C.

(57) ABSTRACT

The present invention relates to a programmable control system for devices and appliances in a home or commercial building. The system includes a main computer connected to network wiring throughout a home or commercial structure that is connected to a number of micro-computers. The programmable control system also includes an input device that has buttons programmatically associated with selected switches and activators throughout the home or building. The input device is connected to the micro-computers which receives signals from the programmable buttons. The micro-computers then activate selected switches or activators associated with selected devices or appliances in the home or commercial structure.

1 Claim, 2 Drawing Sheets

BUILDING CONTROL SYSTEM

CROSS REFERENCE TO RELATED APPLICATION

This application claims the benefit of U.S. Provisional Application No. 62/501,864 filed May 5, 2017.

BACKGROUND OF THE INVENTION

This invention is directed to a control system and more particularly a programmable control system for devices in a home or commercial structure.

Systems for controlling the operation of devices in a building such as lights, speakers, thermostats, and the like are known in the art. While useful, many of these systems are unreliable as they utilize wireless transmissions. Others require excessive additional wiring where installation can be expensive. Accordingly, a need exists for a control system that addresses these deficiencies.

An objective is to provide a programmable control system for household devices.

Another objective is to provide a control system that connects household devices to a remote device.

Yet another objective is to provide a control system for household devices that has wired connections.

Another objective is to provide a control system for household devices that provides a wired connection that is less costly.

Yet another objective is to provide a control system for household devices that is less damaging to the structure of the household or building.

SUMMARY OF THE INVENTION

In general, the present invention relates to a programmable control system for devices located within a home, commercial building, and the like. The programmable control system includes a main computer that has a processor and memory. A wireless router is connected to the programmable control system such that the network wiring system that extends through the walls of a home or commercial structure is connected to the programmable control system. The network wiring system is connected to micro-computers that have a circuit board that is electrically connected to at least one or more switches that are electrically connected to and activate at least one device or appliance in the home or building. The programmable control system also includes a portable input device associated with the main computer that transmits input information to micro-computers and main computer and back to itself.

During initial programming or reprogramming, a user of the system programs buttons on the portable input device to be associated with and control selected home or building devices or appliances. When activating or deactivating a particular switch, the user selects the appropriate button associated with that switch and the input device transmits a signal to the wireless router which in turn transmits a signal through network wiring to the main computer which determines which micro-computer and associated switch have been selected based on the input received. The selected micro-computer activates the selected switch and the input command is completed.

DETAILED DESCRIPTION

Figure 1:
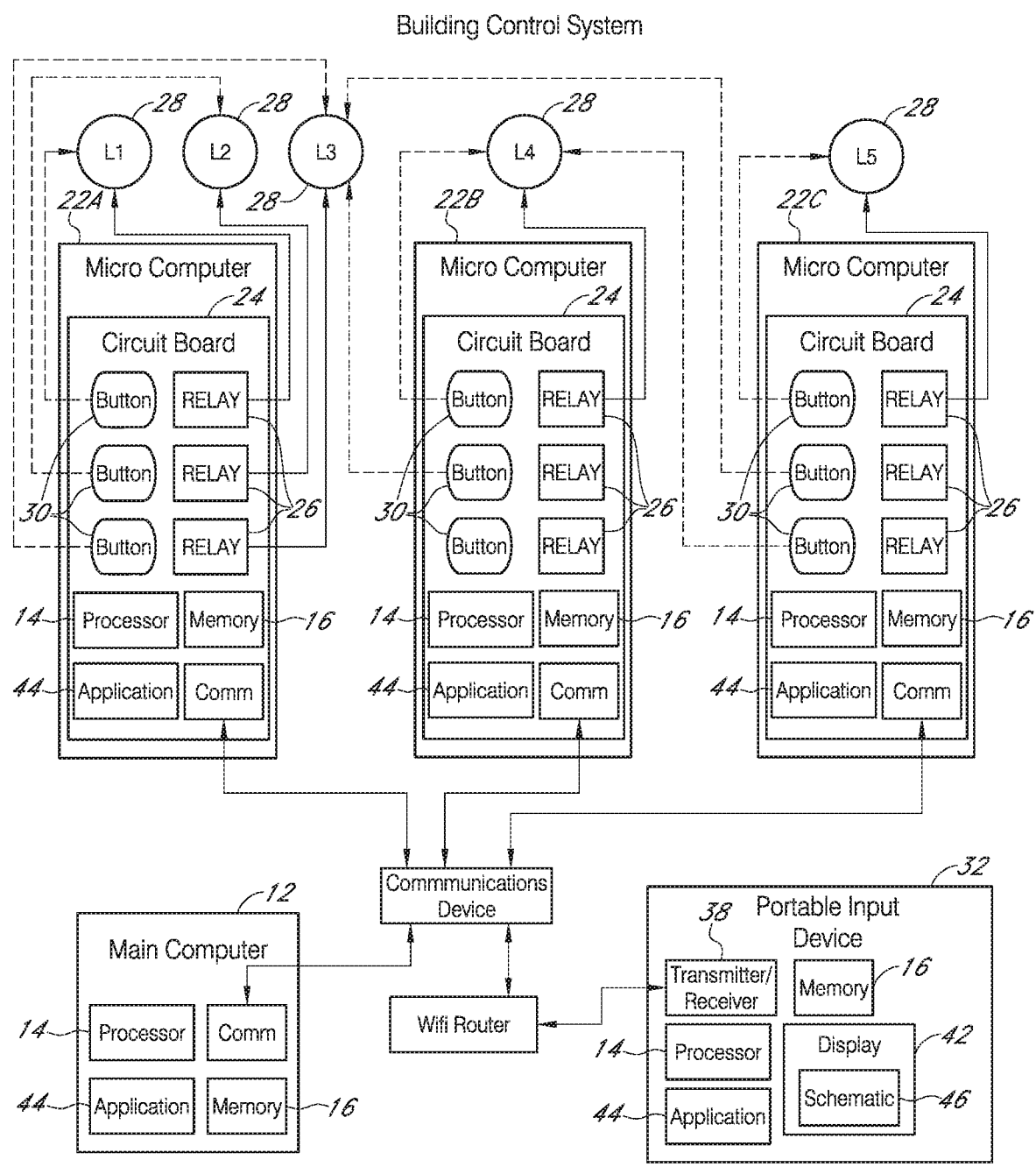
FIG. 1 is a schematic view of a programmable control system.

Referring to the Figures, a building control system 10 includes a main computer 12 having a processor 14 and memory 16. The main computer 12 is connected to a Wi-Fi router 18 and network wiring 20 of a home or commercial structure. Alternatively, or in addition to, the system uses power line communication with the same or a second control. The network wiring extends through the walls of the structure and is connected to a plurality of micro-computers 22.

The micro-computers 22 have a circuit board 24 that is electrically connected to one or more activators, switches or relays 26 that are electrically connected to one or more building devices, appliances, or vehicle 28. The building device or appliance 28 includes any internet of things including, but not limited to, a light, a speaker, a thermostat, a dishwasher, a washing machine, a door lock, a garage door, electronically controlled windows, skylights, garage door openers, or the like. The micro-computers 22 also have a plurality of buttons 30 connected to the circuit board.

A portable input device 32 is associated with the main computer 12. The portable input device 32 is of any type such as a mobile phone, personal computer, remote control or the like. Preferably, the input device has a processor 34, a memory 36, a transmitter 38, a receiver 40, a display 42, and a keyboard and/or voice activation system 43.

Figure 2:
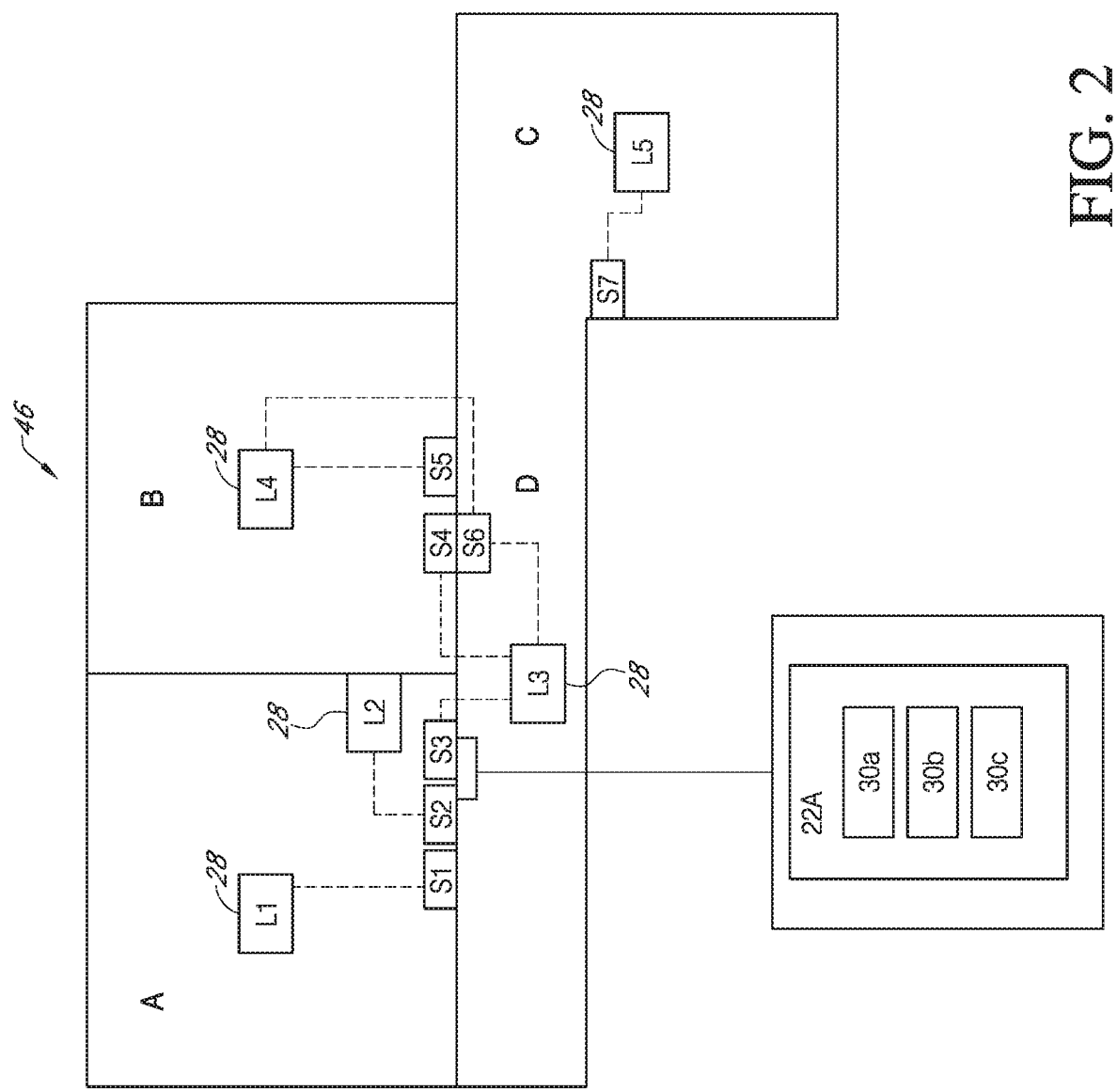
FIG. 2 is a schematic of a building with a programmable control system.

In operation, an operator downloads or installs a phone or web application 44 on the portable input device 32. Preferably, the input device 32 would display a schematic of the building structure 46 and the location of various building devices 28 within the schematic 46. The input device would also display the location of the micro-computers 22 and the buttons 30 associated with the micro-controllers 22 and the switches 26. For example, as shown in FIG. 2, the schematic 46 shows three rooms A, B, and C associated with a hallway D. Within the rooms and hallway are a plurality of lights L1-L5 that are associated with a plurality of switches S1-S7. Switch S1 is wired to activate light L1, switch S2 is wired to activate light L2, switches S3 and S4 are both wired to activate light L3. Switch S5 is wired to activate light L4. Switch S6 is wired to activate lights L3 and L4, and switch S7 is wired to activate light L5.

Using the portable input device (or any device with a web browser) 32, the operator programs the buttons 30 to control selected light combinations. For example, micro-computer 22A is mounted adjacent to and electrically connected to switches S1, S2, and S3. Micro-computer 22 includes buttons 30a, 30b, and 30c. Using the input device 32, the operator first selects micro-computer 22A on the schematic of the building structure. When selected, a screen is displayed on the input device 32 that shows the buttons 30a, 30b, 30c, the switches S1, S2, and S3, and the associated lights L1, L2, and L3. To program the buttons 30, the operator selects button 30a and then either inputs or drags the switches that the operator wishes to have activated by the button 30. For example, for button 30a the operator inputs switches S1 and S2, for button 30b the operator inputs switches S2 and S3, and for button 30c the operator inputs switches S1 and S3. Thus, the operator can program the buttons 30 of the micro-computer 22 using the input device (or any device with a web browser) 32 to control specific light combinations. The buttons 30 of other micro-computers 22 are programmed in the same manner.

Once programmed, an operator activates or deactivates a light combination using the input device 32 (or the local button where light switches traditionally are located). Using the example above the operator activates button 30a on the display of the input device 32. Once activated, the input device 32 transmits a signal to the Wi-Fi router 18 which in turn transmits a signal to the main computer 12. The main computer 12 processes the signal to determine which micro-computer 22, and switches have been selected based upon the received signal. Once determined, the main computer 12 transmits a signal to the selected micro-computer 22 via the network wiring 20. The micro-computer 22 receives the signal and based upon the signal, activates the selected switches. Once activated, the selected switches S1 and S2 allows current to flow from the building wiring 20 through the switches S1 and S2 to lights L1 and L2. To turn off the lights, the operator selects the button 30a on the input device 32 and the process is repeated such that the switch blocks current flow to the lights L1 and L2. The same process is followed for other types of building devices or appliances.

What is claimed is:

1. A control system comprising:

a main computer having a processor and a memory;

a router connected to the main computer;

network wiring of a home connected to the main computer and extending through walls of a building;

a plurality of micro-computers connected to the network wiring and having a circuit board that is electrically connected to a plurality of activators;

a plurality of selected household devices, wherein each of the plurality of selected household devices is connected to at least one of the plurality of activators;

a plurality of buttons connected to the circuit board of each of the plurality of micro-computers;

wherein each of the plurality of buttons are programmable to control the plurality of activators;

wherein each of the plurality of micro-computers are configured to receive an input from an operator via a portable input device and programmatically control the plurality of selected household devices by way of at least one of the plurality of activators based upon the input from the operator; and wherein each of the plurality of buttons are programmable by an operator first selecting a micro-computer on the schematic of the building structure and then selecting a button on the screen displayed on the input device and dragging the switches that are activated by the button selected.

\* \* \* \* \*